(12) United States Patent
Maybee et al.

(10) Patent No.: US 8,589,885 B2
(45) Date of Patent: Nov. 19, 2013

(54) DEBUGGER LAUNCH AND ATTACH ON COMPUTE CLUSTERS

(75) Inventors: Paul E. Maybee, Seattle, WA (US); Daniel Moth, Seattle, WA (US); Gregg Bernard Miskelly, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 509 days.

(21) Appl. No.: 12/894,590

(22) Filed: Sep. 30, 2010

(65) Prior Publication Data
US 2012/0084753 A1 Apr. 5, 2012

(51) Int. Cl.
*G06F 9/44* (2006.01)

(52) U.S. Cl.
USPC ............................................. 717/124

(58) Field of Classification Search
None
See application file for complete search history.

(56) References Cited

U.S. PATENT DOCUMENTS

| | | | | |
|---|---|---|---|---|
| 5,933,639 A * | 8/1999 | Meier et al. | ...................... | 717/129 |
| 6,058,393 A * | 5/2000 | Meier et al. | ...................... | 717/124 |
| 6,986,124 B1 * | 1/2006 | Field et al. | ....................... | 717/124 |
| 7,124,320 B1 | 10/2006 | Wipfel | | |
| 7,441,036 B2 * | 10/2008 | Bomer et al. | ................. | 709/228 |
| 7,512,934 B2 * | 3/2009 | Gatlin et al. | ................... | 717/127 |
| 7,530,053 B2 * | 5/2009 | Pugh et al. | ....................... | 717/124 |
| 7,634,760 B1 * | 12/2009 | Gumtow et al. | ............. | 717/125 |
| 7,660,412 B1 | 2/2010 | Lee | | |
| 7,673,180 B1 * | 3/2010 | Chen et al. | .................. | 714/38.11 |
| 8,156,476 B2 * | 4/2012 | Maybee et al. | ................ | 717/124 |
| 8,205,120 B2 * | 6/2012 | Heidasch et al. | ................ | 714/45 |
| 8,346,870 B2 * | 1/2013 | Jazdzewski | .................... | 709/205 |
| 8,352,621 B2 * | 1/2013 | Di Balsamo et al. | ......... | 709/229 |
| 2003/0204838 A1 * | 10/2003 | Caspole et al. | ................. | 717/130 |
| 2003/0208548 A1 * | 11/2003 | Wydra et al. | .................. | 709/206 |
| 2004/0010778 A1 * | 1/2004 | Kaler et al. | ..................... | 717/130 |
| 2004/0123271 A1 | 6/2004 | Bindewald | | |
| 2004/0199629 A1 * | 10/2004 | Bomer et al. | .................. | 709/224 |
| 2004/0221269 A1 * | 11/2004 | Ray et al. | ....................... | 717/124 |
| 2004/0230954 A1 * | 11/2004 | Dandoy | .......................... | 717/124 |
| 2004/0243883 A1 * | 12/2004 | Shankar et al. | .................. | 714/38 |
| 2004/0268151 A1 * | 12/2004 | Matsuda | ........................ | 713/201 |
| 2005/0050159 A1 * | 3/2005 | Suraski | .......................... | 709/217 |
| 2005/0138113 A1 * | 6/2005 | Brendle et al. | ................ | 709/203 |
| 2005/0216895 A1 * | 9/2005 | Tran | ................................ | 717/127 |

(Continued)

OTHER PUBLICATIONS

Hood et al., "A Debugger for Computational Grid Applications," MRJ Technology Solutions, Numerical Aerospace Simulation Division, NASA Ames Research Center, 2000.

(Continued)

*Primary Examiner* — Philip Wang
(74) *Attorney, Agent, or Firm* — Workman Nydegger

(57) ABSTRACT

Launching a debugging process. A method includes at a compute node on a cluster private network, receiving a debug job via a scheduler of a head node from a client on a public network. The head node is connected to both the cluster private network and the public network. The public network is external to the cluster private network. The method further includes beginning processing the debug job, and as a result initiating debugging by starting one or more debugger remote agents at the compute node. The method further includes beginning processing a user job in the presence of the started debugger remote agents at the compute node. The client is informed that the one or more debugger remote agents are ready to debug the user job. A debugger client at the client is connected to the one or more debugger remote agents.

20 Claims, 7 Drawing Sheets

Debugger Attach Processing

(56) References Cited

U.S. PATENT DOCUMENTS

| | | | |
|---|---|---|---|
| 2006/0048098 A1* | 3/2006 | Gatlin et al. | 717/124 |
| 2006/0161896 A1* | 7/2006 | Hicks et al. | 717/124 |
| 2006/0174225 A1* | 8/2006 | Bennett et al. | 717/124 |
| 2006/0195894 A1* | 8/2006 | Nita et al. | 726/11 |
| 2007/0055957 A1* | 3/2007 | Birenheide et al. | 717/124 |
| 2007/0055958 A1* | 3/2007 | Birenheide et al. | 717/124 |
| 2007/0094532 A1 | 4/2007 | Sengupta et al. | |
| 2007/0113218 A1* | 5/2007 | Nolan et al. | 717/124 |
| 2007/0168985 A1* | 7/2007 | Konishi et al. | 717/124 |
| 2008/0301685 A1* | 12/2008 | Thomas et al. | 718/102 |
| 2009/0024998 A1* | 1/2009 | Hughes et al. | 718/101 |
| 2009/0037775 A1* | 2/2009 | Chi et al. | 714/38 |
| 2009/0307652 A1 | 12/2009 | Maybee et al. | |
| 2009/0307663 A1* | 12/2009 | Maybee et al. | 717/124 |
| 2009/0328005 A1* | 12/2009 | Miskelly | 717/125 |
| 2010/0057865 A1* | 3/2010 | Chan et al. | 709/206 |
| 2010/0162212 A1* | 6/2010 | Stall et al. | 717/124 |
| 2011/0088043 A1* | 4/2011 | Lind et al. | 719/316 |
| 2011/0307871 A1* | 12/2011 | Branda et al. | 717/129 |
| 2012/0084753 A1* | 4/2012 | Maybee et al. | 717/124 |
| 2012/0124426 A1* | 5/2012 | Maybee et al. | 714/38.11 |
| 2012/0131555 A1* | 5/2012 | Hossain et al. | 717/124 |
| 2012/0254867 A1* | 10/2012 | Lind et al. | 718/1 |

OTHER PUBLICATIONS

Author Unknown, "Computer Cluster Network Requirements," http://technet.microsoft.com/en-us/library/cc720171%28WS.10%29.aspx Updated Jun. 6, 2006.

Ciapala, "Develop Turbocharged Apps for Windows Compute Cluster Server," http://msdn.microsoft.com/en-us/magazine/cc163620.aspx, Apr. 2006.

Bergstrom, "Developing Software in Visual Studio .NET with Non-Administrative Privileges," http://msdn.microsoft.com/en-us/library/aa289173%28VS.71%29.aspx, Dec. 2003.

Author Unknown, "Using Microsoft Message Passing Interface," http://technet.microsoft.com/en-us/library/cc720120(WS.10).aspx, Updated Jun. 6, 2006.

Author Unknown, "How to: Configure and Launch the MPI Cluster Debugger," http://msdn.microsoft.com/en-us/library/dd560809.aspx, Available as early as Nov. 2009.

* cited by examiner

DEBUGGER LAUNCH AND ATTACH ON COMPUTE CLUSTERS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnected computers can be used to implement cluster computing. Cluster computing involves the use of multiple computers to perform jobs that may be too large for a single computer to perform. Instead, the jobs are subdivided, and subdivisions sent to individual computer systems in the cluster. Typically, the cluster is implemented with a head node that accepts jobs and assigns the jobs or portions of the jobs to compute nodes in the cluster. The compute nodes are typically implemented in a private network not accessible publically by computer systems external to the private network. The head node may be a member of both the private network and one or more public networks such that the head node can accept jobs from external clients that may wish to submit jobs to the cluster.

In computing systems, there are often problems that arise with respect to systems crashing or returning unexpected results. To determine the causes of systems crashing or unexpected results, various debugging techniques are used. Some techniques involve the use of debuggers. Debuggers may be software applications that run alongside, or underneath executing code. Debuggers can be used to step through code (i.e. execute a discrete number of instructions and then wait for user input before executing a next discrete number of instruction), set break points in code to stop execution at certain points in executing code, etc. However, in cluster systems, starting a debugger may be more difficult in view of the fact that the system that a developer would like to debug may be on a network external to the system directly accessible by the developer. That is, the developer may be using a developer application on a client on the public network, while the application to be debugged may be running as jobs on a cluster that is on a private network not directly accessible by the client computer on the public network. Thus, the system that one would like to debug may not be able to directly provide a debugger. Rather, connecting a debugger to a job executing on a compute cluster may require that the nodes of the cluster be on the same network as the client and/or that the user have administrative access to the compute cluster.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein may be practiced in a computing environment including a cluster computing system. The embodiment includes a method with acts for launching a debugging process. The method includes at a compute node on a cluster private network, receiving a debug job via a scheduler of a head node from a client on a public network. The head node is connected to both the cluster private network and the public network. The public network is external to the cluster private network. The method further includes beginning processing the debug job, and as a result initiating debugging by starting one or more debugger remote agents at the compute node. The method further includes beginning processing a user job in the presence of the started debugger remote agents at the compute node. The client is informed that the one or more debugger remote agents are ready to debug the user job. A debugger client at the client is connected to the one or more debugger remote agents.

Another embodiment is practiced in a computing environment including a cluster computing system. This embodiment includes a method with acts for attaching a debugging process. The method includes at a compute node on a cluster private network that is executing a user job, receiving a message to start a debug job from a client on a public network via a system that is connected to both the cluster private network and the public network. The public network is external to the cluster private network. The method further includes beginning processing the debug job, and as a result initiating debugging of the user job, by starting one or more debugger remote agents at the compute node. The client is informed that the one or more debugger remote agents are ready to debug the user job. A debugger client at the client is connected to the one or more debugger remote agents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed herein are various embodiments including debugging functionality for a cluster. Embodiments may include functionality for launching a job under debugger control. Alternatively, embodiments may include functionality for attaching a debugger to an existing job. As illustrated, some of these embodiments may implement this without direct client access to the compute nodes or administrative privileges on the cluster.

Figure 1:
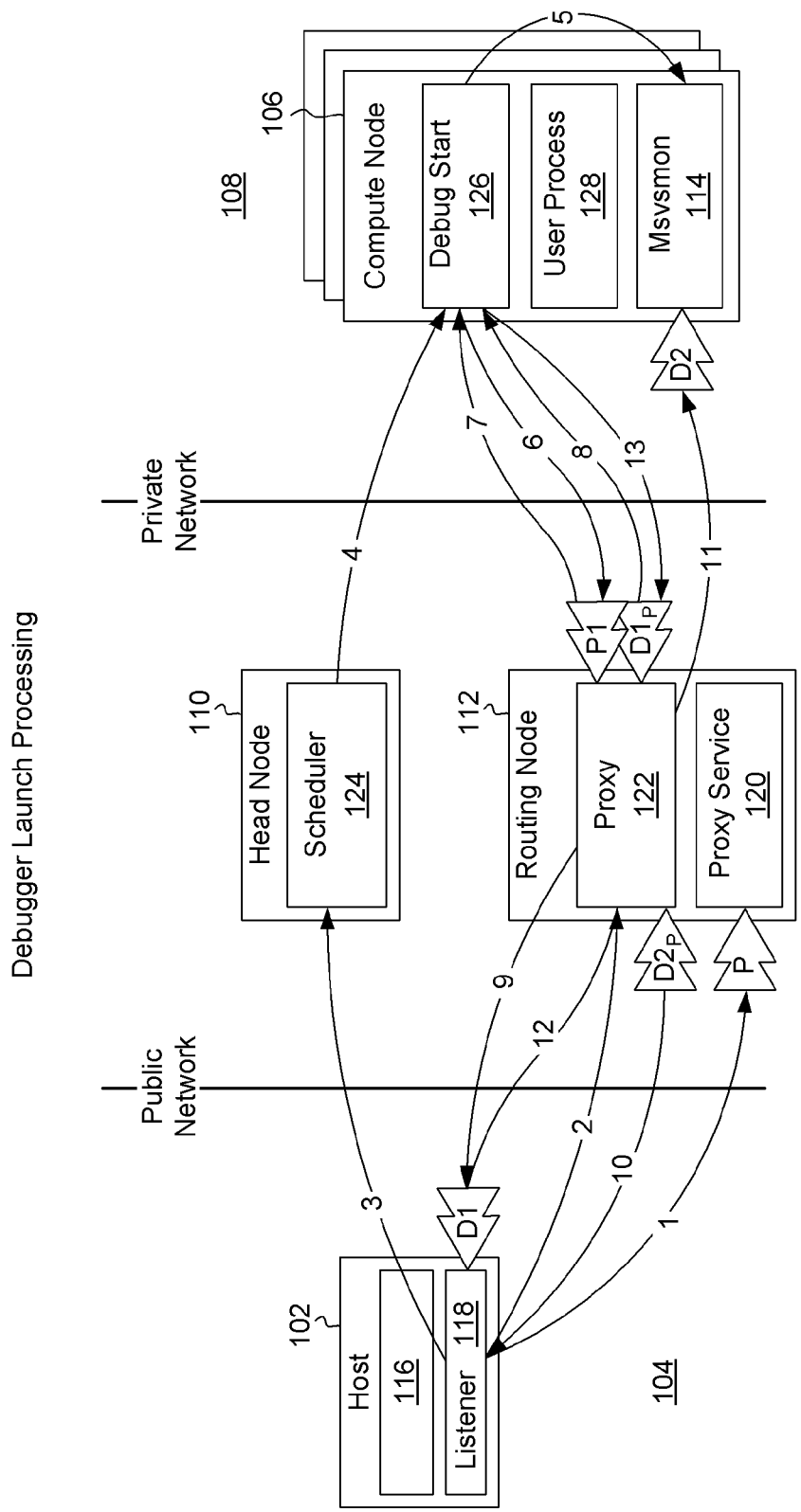
FIG. 1 illustrates a debugger launch scenario using a proxy.

FIG. 1 is illustrative. FIG. 1 illustrates a client 102 on a public network 104. The client may wish to provide jobs to a cluster. The cluster may have compute nodes, such as compute node 106, which perform work associated with the jobs. FIG. 1 illustrates that embodiments will typically include a plurality of compute nodes 106 to which jobs can be assigned by the head node 110. The compute nodes may be on a private network 108 that is separate from the public network 104. In particular, the private network 108 is partitioned from the public network 104 such that systems on the public network 104 cannot directly communicate with systems on the private network 108. For example, the networks may have different domains.

Rather, the client 102 provides jobs and other communication through an intermediary which may be implemented using one or more systems such as the head node 110 and/or the routing node 112. A client 102 may submit a job to an intermediary which then the forwards the job to one or more compute nodes 106. The job submitted by the client 102 may cause an error while being performed by the compute node 106. Embodiments described herein may include functionality for initiating debugging by the client 102 on the cluster to debug the errors. This may be done, in one example, by launching a remote agent debugger, after which code is run on top of the debugger remote agent.

In an illustrative example, launching a debugging process may be performed by a client 102 on the public network 104 external to the cluster private network 106, sending a user job with debugger tasks to an intermediary, such as the head node 110. The head node 110 may create jobs for one or more compute nodes 106 to execute debugger tasks. Executing a debugger task at the compute node 106 initiates remote debugging of a previously sent user job from the client 102 (or some other system) by starting one or more debugger remote agents 114 at one or more compute nodes 106 on the cluster private network 108. The client 102 can then be informed that remote agents 114 are ready for debugging. In some embodiments this may be accomplished by using a routing node 112 that includes a proxy that allows public network systems 104 to call into private network 108 systems. Further, the client 102 may have a debugger client. The debugger client at the client 102 can be connected to debugger remote agents, such as for example, through the routing node 112.

The following illustrates additional details of one example. In particular, in the following example, made with continued reference to FIG. 1, an embodiment is illustrated where an integrated development environment including a developer application 116 can be used. The developer application can be used by a developer to develop applications, and in particular applications intended for cluster computing. In the particular example illustrated, the developer application 116 may be implemented using Visual Studio®, available from Microsoft Corporation of Redmond, Wash.

As illustrated at 1, developer application 116 creates a listener 118. The listener 118 opens a port D1 to facilitate communications. In some embodiments, the port assigned (as well as other ports described herein) may be a port in the range of 13225 to 13719 inasmuch as these ports are generally unassigned. The listener 118 opens link, P, to a well known proxy service 120 on the routing node 112 running as a local administrator. The proxy may be selected, in some embodiments, based on configuration data or project settings. The listener 118 sends an initialize message to the proxy service, 120, the message illustrated herein as InitProxy(D1, U), via P where U is the user's cluster credentials. The proxy service 120 forks a proxy instance with users credentials (U) passing it D1 and the reply context for the InitProxy message. Note that in some embodiments, the messages sent and received described herein may be encrypted.

As illustrated at 2, the proxy 122 opens $D1_p$ to the proxy 112 for D1 and opens a port P1 for new proxy requests and sends a reply InitProxyReply(P1, $D1_p$) back to the listener 118.

As illustrated at 3, the listener 118 sends the scheduler 124 at the head node 110 a new job message: NewJob(DebugStart, P1, $D1_p$). This message specifies a new debugger job. In some embodiment, the head node 110 and scheduler 124 information for routing by the listener, may be included in configuration data and/or development project settings.

As illustrated at 4, the scheduler 124 creates the job at each compute node 106 running DebugStart(P1, $D1_p$).

As illustrated at 5, Debug Start 126 selects an address D2 and starts the appropriate remote agents 114, in this example by calling msvsmon(D2, E), and waits for an event E. The remote agent 114 starts up and opens D2 for connections. The remote agent 114 sets an event E when it is ready to receive on D2.

As illustrated at 6, Debug Start 126 sends a routing message, RouteTo(D2), to the proxy 122 (P1). The proxy 122 creates proxied port $D2_p$.

As illustrated at 7, the proxy responds to Debug Start 126 with a routing reply message, RouteToReply($D2_p$).

As illustrated at 8, Debug Start 126 sends a message indicating that the debug agent is started, DebugAgentStarted ($D2_p$), to the proxy 122 at $D1_p$.

At 9, the proxy 122 forwards the DebugAgentStarted message to the listener 118 at D1. The listener 118 invokes the developer application 116 debugger instructing it to connect to the remote agent at $D2_p$.

As illustrated at 10, the developer application debugger opens a remote debugging session with the proxy 122 at $D2_p$.

As illustrated at 11, the proxy 122 opens a session with the remote agent 114 at D2. The proxy 122 routes debugging messages in both directions. The developer application debugger, through the proxy 122 instructs the remote agent 114 to launch a user process 128. The user process 128 may be the process to be debugged. The remote agent 114 launches and returns a process identifier identifying the user process 128. The developer application debugger informs the listener 118 that the launch is complete and gives the listener 118 the process identifier pid.

As illustrated at 12, the listener 118 sends a DebugAgentStartedReply(pid) message to the proxy 122 at $D2_p$.

As illustrated at 13, the proxy 122 forwards the reply to debug start 126. Debug start 126 opens a handle to the user process 128 and waits for its termination.

In the example illustrated above, various components are illustrated. The following discussion illustrates additional details of some of these components.

The listener 118, in the example illustrated, is a developer application 116 component that is created at debugging startup and continues in existence until the debugging session has terminated. The purpose of the listener 118 is to initiate developer application 116 debugging for remote processes that want to join the debugging session. The listener 118 is a service (in one example, a Windows Communication Foundation® service available from Microsoft® corporation of Redmond Wash.) that responds to requests to initiate remote debugging sessions. The following illustrates an example of a request to initiate remote debugging sessions:

PID                   InitiateRemoteDebugSession(Endpoint RemoteAgentAddress, Endpoint ProxyAddress)

In response to this message the listener 118 will invoke the developer application 116 debuggers remote launch/attach code and provide it the RemoteAgentAddress and optionally a ProxyAddress and user credentials. The developer application 116 launch code will open a connection to the RemoteAgentAddress (via the proxy 122) and request that the launch (or as illustrated below attach) take place. On successful completion a process identifier (pid) is returned to the listener 118. The listener 118 replies to the message with the pid. Multiple messages may be expected. In some embodiments, the listener 118 will respond to all messages that it receives.

The proxy service 120 is a service running under local system credentials on the routing node 112. In some embodiments, the proxy service 102 may be a Windows Communication Foundation® service. The proxy service 120 starts proxies 122 for debugging sessions. The proxy service 120 publishes a well-known address and listens on it for proxy requests. The following illustrates an example publish message:

Endpoint NewProxySession(Credentials userCredentials)

When a request comes in, the proxy service 120 validates the user credentials, allocates an endpoint port, and starts a proxy 122 process under the user's credentials. The proxy service 120 waits for the proxy 122 to open the endpoint and then responds to the NewProxySession request with the proxy's 122 endpoint description.

The proxy 122 is a service, that in some embodiments may be a Windows Communication Foundation® service, running under user credentials. The proxy 122 is responsible for routing messages between the debugger (e.g. at the developer application 116) on a public network 104 and its remote agents 114 on a private network 108. At startup it opens an endpoint for routing requests. The following illustrates an example of a message to open an endpoint for routing requests:

Endpoint RouteTo(Endpoint endpoint)

The request comes from a process on network A (B) then the Router opens a new Endpoint on B (A), the proxyEndpoint, and returns a description in the reply.

Debug start 126 runs under user credentials and is responsible for starting the remote agent 114 debugger process on the machine with a process (e.g. user process 128) to be debugged. Debug start 126 may be invoked by a cluster manager directly, or by a cluster sub-scheduler that is scheduling tasks for a dynamic computation. Debug start 126 initiates communications to the listener 118 and informs the listener of the dynamic address of the remote agent 114 it has created.

Figure 2:
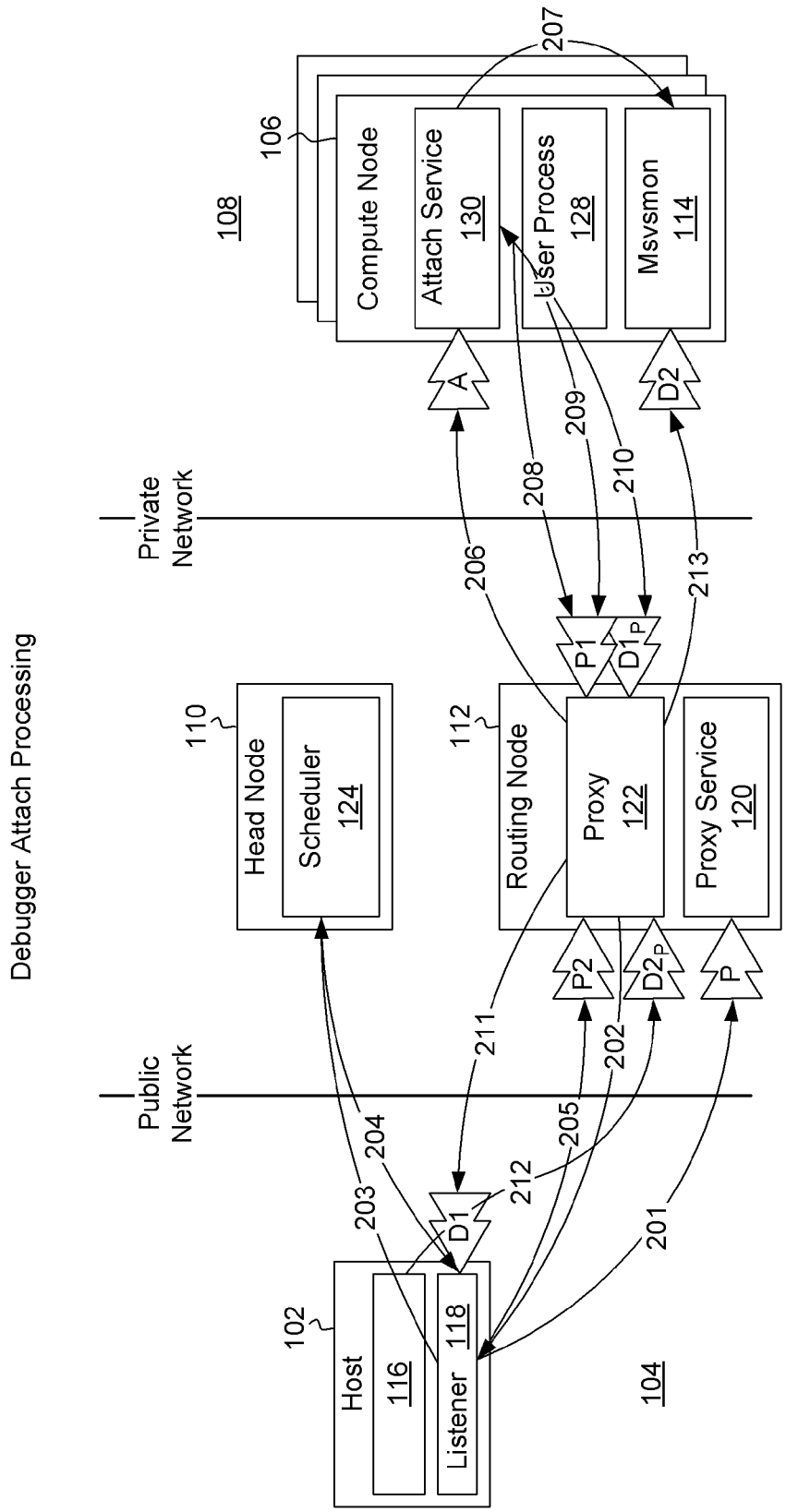
FIG. 2 illustrates a debugger attach scenario using a proxy.

While the preceding example shown in FIG. 1 has illustrated an example of debugging a user process 128 by starting debugging capabilities and then starting the user process 128, other embodiments may attach debugging functionality to an already executing process. The following and FIG. 2 illustrates an example of debugger attach.

As illustrated at 201, developer application 116 creates a listener 118. The listener 118 opens D1. Listener 118 opens a link to well known proxy service 120 (P) on routing node (for example, form configuration data and/or developer project settings) running as local admin. The listener 118 sends a proxy initialization message InitProxy(D1, U) to P where U is the user's cluster credentials. The proxy service 120 forks a proxy 122 instance with users credentials (U) passing it D1 and the reply context for the InitProxy message.

As illustrated at 202, the proxy 122 opens $D1_p$ to the proxy 122 for D1 and opens P1 (and P2) for new proxy requests from private and public networks 104 and 106 respectively and sends a proxy initialization reply message InitProxyReply(P1, P2, $D1_p$) back to the listener 118.

As illustrated at 203, the listener 118 requests job details from the scheduler 124.

As illustrated at 204, listener 118 receives a list of compute nodes 106 and process id's in return.

As illustrated at 205, for each compute node 106 in the list, the listener 118 sends a ForwardMessage(NodeName, A, DebugStart(P1, $D1_p$), U) to P2.

As illustrated at 206, the proxy 122 forwards the DebugStart message to the attach service 130 at well known address A on node "NodeName".

As illustrated at 207, the attach service 130 selects an address D2 and starts the user agent 114, such as by calling msvsmon(D2, E) under user credentials U and waits for an event E. Remote agent 114 starts up and opens D2 for connections. Remote agent 114 sets an event E when it is ready to receive on D2.

As illustrated at 208, attach service 130 sends a RouteTo (D2) message to the proxy 122 (P1). The proxy 122 creates proxied port $D2_p$.

As illustrated at 209, The proxy 122 responds to attach service 130 with a RouteToReply($D2_p$).

As illustrated at 210, attach service 130 sends a DebugAgentStarted($D2_p$) message to the proxy at $D1_p$.

As illustrated at 211, the proxy 122 forwards the DebugAgentStarted message to the listener 118 at D1. The listener 118 invokes the developer application 116 debugger instructing it to connect to the remote agent at $D2_p$.

As illustrated at 212, the developer application 116 debugger opens a remote debugging session with the proxy 122 at $D2_p$.

As illustrated at 213, the proxy 122 opens a session with remote agent 114 at D2. It routes debugging messages in both directions. The debugger instructs remote agent 114 to attach to a user process 128 identified by a process identifier (pid). Remote agent 114 attaches to the process. The developer application 116 debugger informs the listener 118 that the attach is complete.

The following illustrates details of the attach service 130 in some embodiments. The attach service 130 runs under local system credentials and is responsible for starting the remote debugger process remote agent 114 on the machine with a process (e.g. user process 128) to be debugged. The attach service 130 is a system service running on any node that supports remote cluster attach. The attach service 130 listens for a DebugStart message from the listener 118 and then creates a remote agent 114 process under the user credentials contained in the message. It informs the listener 118 of the dynamic address of the remote agent 114 it has created.

Figure 3:
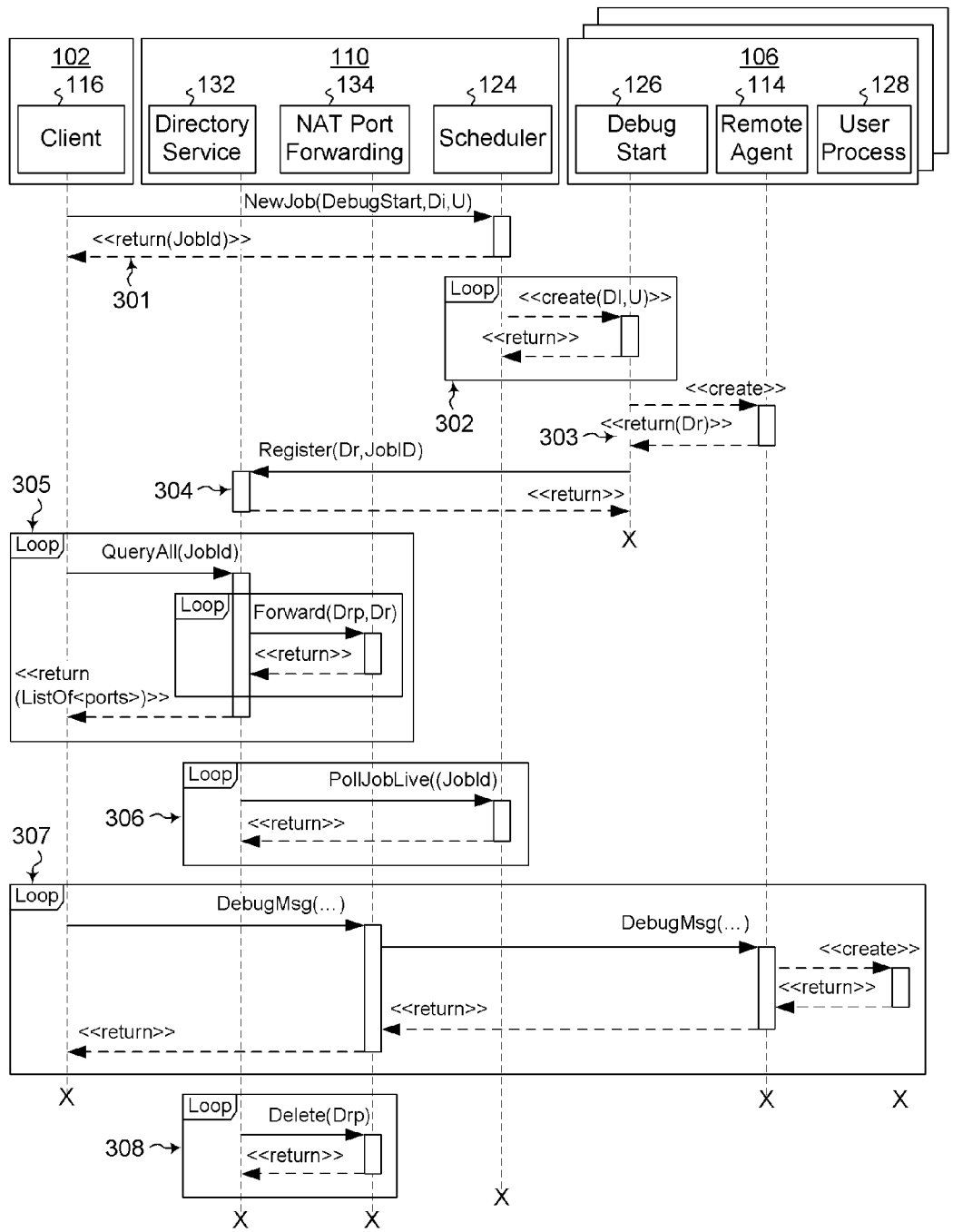
FIG. 3 illustrates a debugger launch scenario using NAT forwarding.
Figure 4:
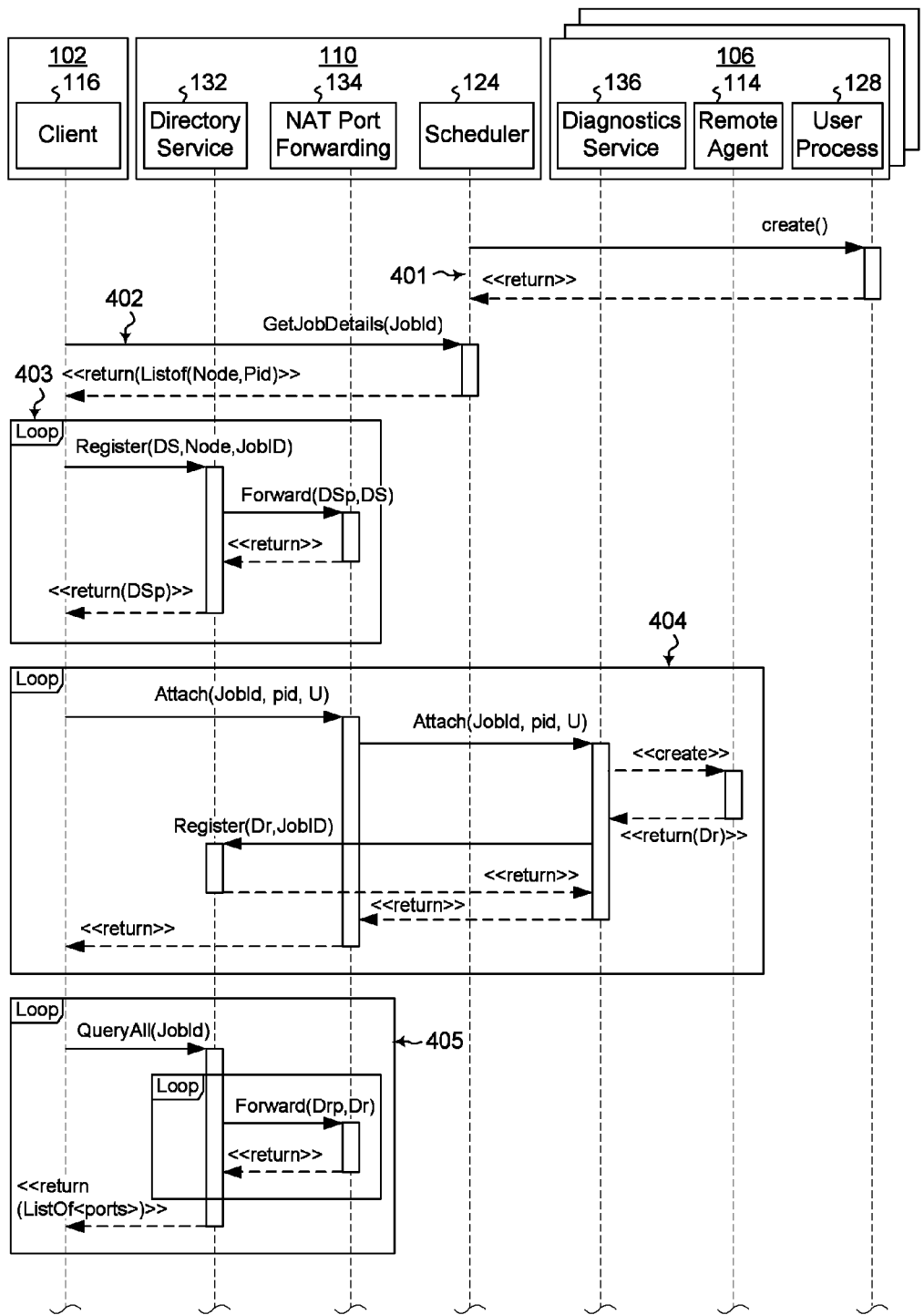
FIG. 4 illustrates a debugger attach scenario using NAT forwarding.
Figure 4:
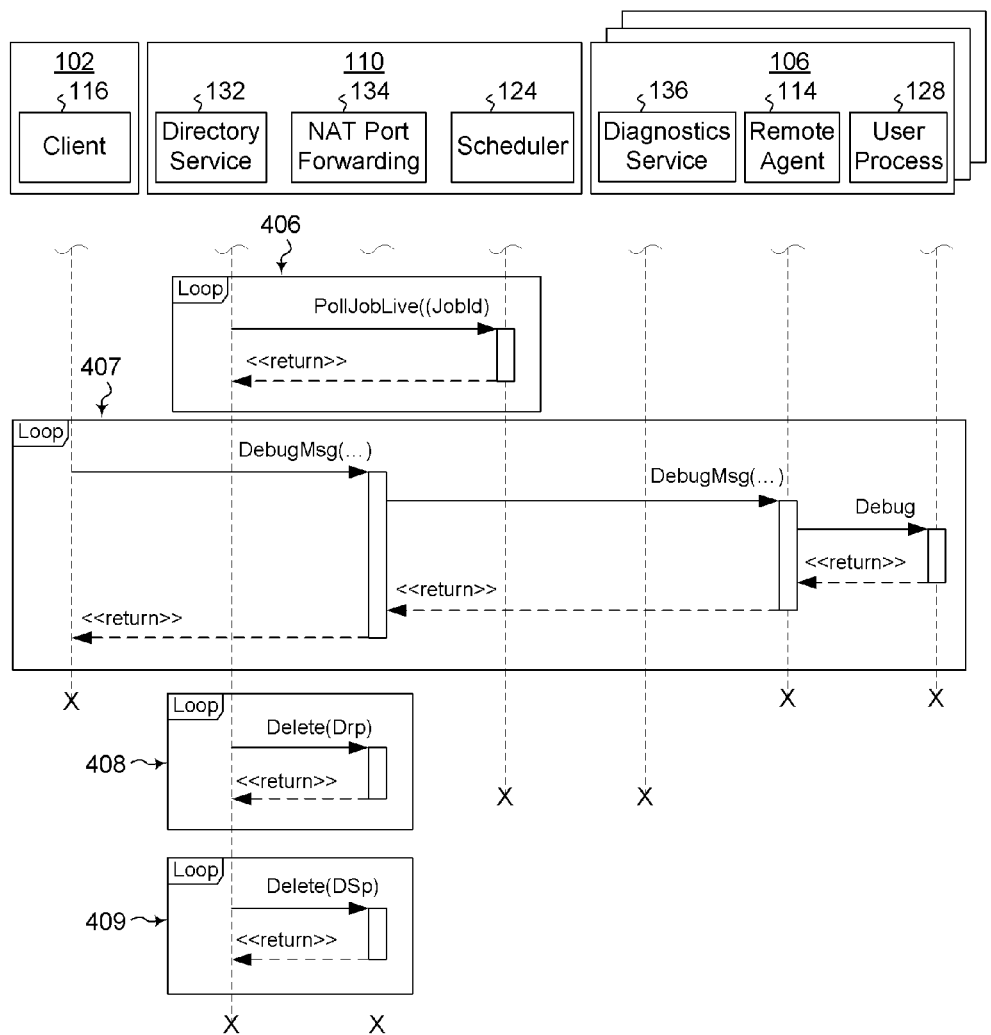

While the embodiments illustrated above use a proxy to communicate between the public and private networks, other embodiments may use a directory service and NAT port forwarding. For example FIGS. 3 and 4 illustrate interaction diagrams showing launch and attach examples using a directory service and NAT port forwarding. In particular, FIG. 3 illustrates the launch scenario. FIG. 4 illustrates the attach scenario.

As with the examples previously discussed, a cluster contains two kinds of nodes, a head node 110 and a set of compute nodes 106. The head node 110 is connected to two networks, a public network and a private network. The compute nodes 106 are each connected only to the private network. Client machines, such as host machines 102 are on the public network. Routing is not enabled between the public and private networks except, in this particular example, via explicit NAT port mapping at the head node 110.

A number of actors are involved in cluster attach and launch implementations. One such actor is the developer application 116 which may include a debugger user interface host.

Another actor is a directory service 132, which may be an application running as a service (such as for example a Windows® service) that provides a directory of forwarding ports for a cluster job. The directory service may runs on the cluster's head node 110. NAT port forwarding 134, may be a network address translation service running on the cluster's head node 110. The server scheduler 124, running on the head node 110, schedules user jobs to execute on the cluster's compute nodes 106.

A diagnostics service 136 is an application executing as a service (such as a Windows® service) on each compute node 106. The diagnostics service 136 handles debugger requests to attach to a process as shown in the attach example of FIG. 4. The diagnostic service 136 is started automatically at boot time and listens on a well know port, DS, for the debugger requests. The diagnostic service 136 creates an instance of a remote agent 114 to satisfy the request. Debug start 126 is a task injected by the debugger into a user job. Debug start 126 creates an instance of a remote agent 114 to launch the user process 128 under debugger control. The remote agent 114 is the developer application 116 debugger's remote helper process. The remote agent 114 is started on a compute node 106 by the diagnostic service 136 in response to an attach request. The user process 128 is the process to be debugged.

Referring now to FIG. 3, an example of launching debugging on a cluster and debugging a user process is shown. At 301, the developer application 116 user requests via the scheduler 124 that his job is queued for execution on a cluster.

At 302, the scheduler 124 assigns a set of compute nodes 106 to the job and starts the job running on each node 106.

At 303, the first task in the job is the debug start task 126. The debug start task 126 creates a remote agent 114 process on each compute node 106 in the set of compute notes, which each opens port Dr and listens for debugger connections.

At 304, after the remote agent 114 is started, debug start 126 registers the Dr ports for each of the compute nodes 106 with the directory service 132.

At 305, the developer application 116 polls the directory service 132 for all the ports registered for the user's job until it receives one mapped port, Drp, for each remote agent 114. The directory service 132 will create the port mappings via NAT as needed to fulfill the requests.

At 306, once ports have been created for a job, the directory service 132 periodically polls the scheduler 124 to verify that the job has not terminated.

At 307, for each registered port, the developer application 116 connects to the remote agent 114 on that compute node 106, via Drp, and creates and debugs the user process 128. Messages continue back and forth between the developer application 116 and the remote agent 114 until the debugging session is complete. Either immediately following the completion of the debugging session, or sometime later, the user processes 128 end and the job is finished.

At 308, the directory service 132 discovers job completion via the scheduler 124 and deletes all the Drp forwarding ports.

The following illustrates a cluster attach scenario. At 401, the user queues a job to the scheduler 124. The scheduler 124 gives it a JobId. The scheduler 124 at some time later starts the user job (comprised of user processes 128) executing on a set, S, of compute nodes 106.

At 402, the user decides to debug his executing job. He starts the developer application 116 and beings the cluster attach process. He identifies his cluster's head node 110 and JobId. The developer application 116 queries the scheduler 124 for a list of compute node names and process ids for the user processes 128 of the job.

At 403, for each compute node 106 in the list returned by the scheduler 124, the developer application 116 registers its diagnostic service's 136 port, DS, with the directory service 132. The directory service 132, in turn, requests NAT port mapping for DS. The directory service 132 returns the mapped port, DSp. This process results in one DSp created for each compute node 106. Messages sent to a DSp will be routed through the head node 110 to the matching DS.

At 404, for each compute node 106, the developer application 116 sends an attach request to DSp. The message is forwarded to the compute node's 106 diagnostic service 136 on port DS. The diagnostic service 136 creates an instance of the remote agent 114 on the compute node 106. The remote agent 114 opens a port, Dr, and listens for debugger connection requests from a debugger at the client 102 associated with the developer application 116. After the remote agent 114 is started the diagnostic service 136 registers Dr with the directory service 132. The attach request is then complete.

At 405, the developer application 116 polls the directory service 132 for all the ports registered for the user's job until it receives one mapped port, Drp, for each compute node 106. The directory service 132 will create the port mappings via NAT as needed to fulfill the requests.

At 406, once ports have been created for a job, the directory service 132 periodically polls the scheduler 124 to verify that the job has not terminated.

At 407, for each user process 128 on each compute node 106, the developer application 116 connects to the remote agent 114 on that compute node 106, via Drp, and begins a debugging session for the user process 128. Messages continue back and forth between the developer application 116 (and in particular the debugger module of the developer application) and the remote agent 114 until the debugging session is complete. Either immediately following the completion of the debugging session, or sometime later, the user processes 128 end and the job is finished.

At 408, the directory service 132 discovers job completion via the scheduler 124 and deletes all the Drp forwarding ports.

At 409, the directory service 132 also deletes all the DSp ports associated with the job.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
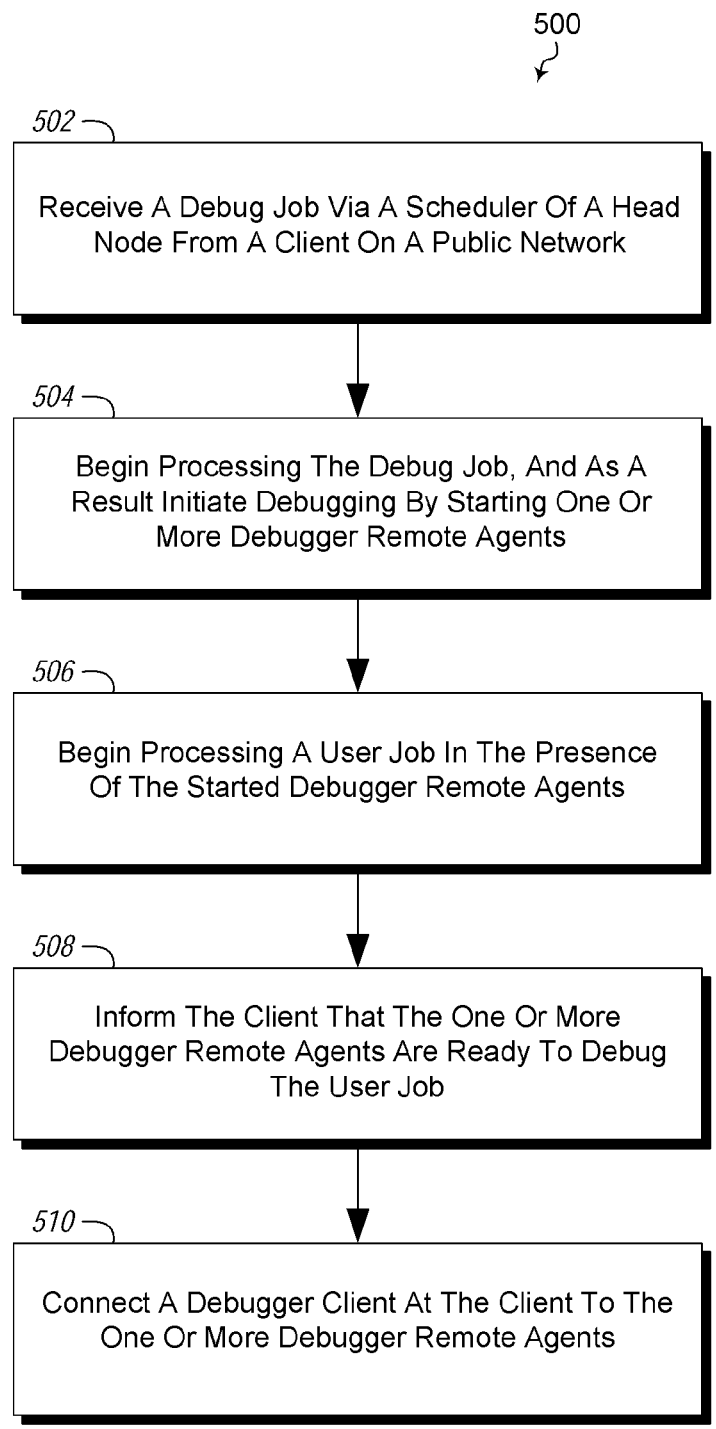
FIG. 5 illustrates a method of launching a debugger.

Referring now to FIG. 5, a method 500 is illustrated. The method 500 may be practiced in a computing environment including a cluster computing system. The method 500 includes acts for launching a debugging process. The method 500 includes at a compute node on a cluster private network, receiving a debug job via a scheduler of a head node from a client on a public network (act 502). The head node is connected to both the private network and the public network. The public network is external to the cluster private network. For example, as illustrated in FIG. 1, a compute node 106 may receive a debug job from the client 102 routed through the head node 110, and in particular through the scheduler 124 of the head node 110.

The method 500 further includes beginning processing the debug job, and as a result initiating debugging by starting one or more debugger remote agents at the compute node (act 504). For example, with reference to FIG. 1, the remote agent 114 may be started.

The method 500 further includes beginning processing a user job in the presence of the started debugger remote agents at the compute node (act 506). For example, the compute node 106 may begin processing the user process 128 in the presence of the running remote agent 114.

The method 500 further includes informing the client that the one or more debugger remote agents are ready to debug the user job. For example, FIG. 1 illustrates that a message may be sent to the proxy 122, which is then forwarded to the listener 118 of the developer application 116.

The method 500 further include connecting a debugger client at the client to the one or more debugger remote agents. For example, a debugger included in the developer application 116 may be connected to one or more remote agents 114 as described above.

Figure 6:
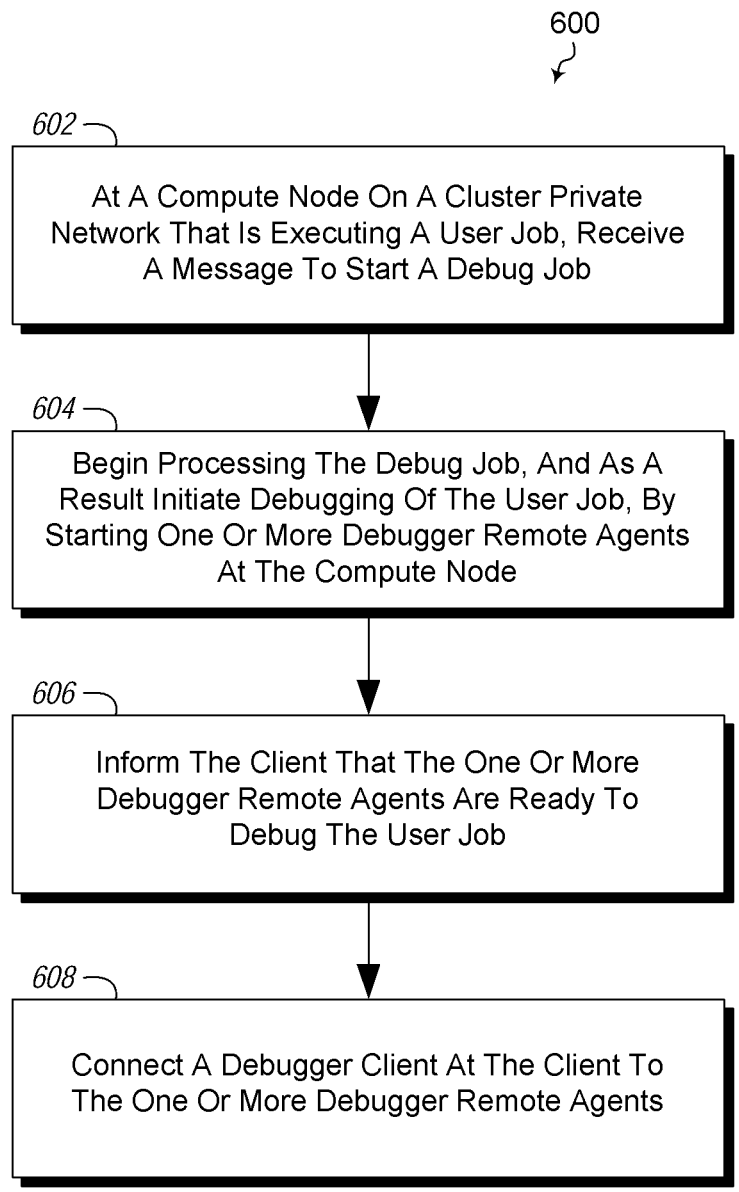
FIG. 6 illustrates a method of attaching a debugger.

Referring now to FIG. 6, another method 600 is illustrated. The method 600 may be practiced in a computing environment including a cluster computing system. The method 600 includes acts for attaching a debugging process. The method 600 includes at a compute node on a cluster private network that is executing a user job, receiving a debug job from a client on a public network via a system that is connected to both the cluster private network and the public network (act 602). The public network is external to the cluster private network. For example, as illustrated in FIG. 2, a public network 104 and cluster private network 108 are illustrated. A client 102 is on the public network 104, and a compute node 106 is on the cluster private network 108. The compute node may receive a message to start a debug job from the routing node 112.

The method 600 further includes beginning processing the debug job, and as a result initiating debugging of the user job, by starting one or more debugger remote agents at the compute node (act 604). In particular, the attach service 130 may start the user agent 114.

The method 600 further includes informing the client that the one or more debugger remote agents are ready to debug the user job (act 606).

The method 600 further includes as a result connecting a debugger client at the client to the one or more debugger remote agents (act 608).

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a cluster computing system, a method of launching a debugging process, the method comprising:
   at a compute node on a cluster private network, receiving a debug job via a scheduler of a head node, the debug job originating from a client on a public network, wherein the head node is connected to both the cluster private network and the public network, and wherein the public network is external to the cluster private network;
   beginning processing the debug job at the compute node, and as a result, initiating debugging by starting a debugger remote agent at the compute node, including the debugger remote agent opening a network port and listening on the network port for debugger connection requests originating from a debugger client at the client;
   beginning processing a user job at the compute node in the presence of the started debugger remote agent at the compute node;
   informing the client that the debugger remote agent is ready to debug the user job; and
   as a result of informing the client, the debugger remote agent at the compute node receiving a debugger connection request at the network port, and connecting the debugger client at the client to the debugger remote agent.

2. The method of claim 1 wherein the client comprises a listener and wherein connecting the debugger client at the client to the debugger remote agent comprises connecting the listener to the debugger remote agent.

3. The method of claim 2, wherein communications are pulled from the client.

4. The method of claim 2, wherein communications are pushed from the client.

5. The method of claim 1, wherein communications between the client and the compute node are through a proxy on a system coupled to both the public network and the cluster private network.

6. The method of claim 1, wherein communications between the client and the compute node are through a NAT service on a system coupled to both the public network and the cluster private network.

7. The method of claim 1, further comprising receiving the user job via the scheduler of the head node from the client on the public network.

8. The method of claim 1, further comprising opening one or more proxy ports to facilitate communications between the client and the compute node, and wherein the one or more proxy ports are selected from the range of 13225 to 13719.

9. The method of claim 1, wherein the client comprises a developer application used by a developer to develop application for cluster computing, and wherein messages from the client are received from the developer application.

10. In a computing environment comprising a cluster computing system, a method of attaching a debugging process, the method comprising:
    at a compute node on a cluster private network that is executing a user job, receiving a message to start a debug job from a client on a public network, via a head node that is connected to both the cluster private network and the public network, and wherein the public network is external to the cluster private network
    beginning processing the debug job at the compute node, and as a result, initiating debugging of the user job, by starting a debugger remote agent at the compute node, including the debugger remote agent opening a network port and listening on the network port for debugger connection requests originating from a debugger client at the client;
    informing the client that the debugger remote agent is ready to debug the user job; and
    as a result of informing the client, the debugger remote agent at the compute node receiving a debugger connection request at the network port, and connecting the debugger client at the client to the debugger remote agent.

11. The method of claim 10 wherein the client comprises a listener and wherein connecting the debugger client at the client to the debugger remote agent comprises connecting the listener to the debugger remote agent.

12. The method of claim 11, wherein communications are pulled from the client.

13. The method of claim 11, wherein communications are pushed from the client.

14. The method of claim 10, wherein communications between the client and the compute node are through a proxy on a system coupled to both the public network and the cluster private network.

15. The method of claim 10, wherein communications between the client and the compute node are through a NAT service on a system coupled to both the public network and the cluster private network.

16. The method of claim 10, further comprising receiving the user job via a scheduler of the head node from the client on the public network.

17. The method of claim 10, further comprising opening one or more proxy ports to facilitate communications between the client and the compute node, and wherein the one or more proxy ports are selected from the range of 13225 to 13719.

18. The method of claim 10, wherein the client comprises a developer application used by a developer to develop application for cluster computing, and wherein messages from the client are received from the developer application.

19. A computer system, comprising:
    a client computer system that implements a developer application, a head node computer system that implements a scheduler and a directory service, and a cluster including a set of compute nodes,
    wherein the developer application at the client computer system, the scheduler and the directory service at the head node computer system, and the cluster are configured to implement a method of launching a debugging process using NAT forwarding, the method including the following:
       at the developer application, receiving user input requesting that a job be scheduled for execution on the cluster;
       at the developer application, sending the job to the scheduler;
       at the scheduler, queuing the job for execution on the cluster;

at the scheduler, assigning the set of compute nodes to the job causing the job to start running on each compute node;

wherein a first task in the job is a debug start task, executing the debug start task causing a remote agent process to be created at each compute node in the set of compute nodes;

each remote agent opening a first port and listening on the first port for debugger connections from a debugger at the developer application;

registering the first port on each compute agent with the directory service;

at the developer application polling the directory service for all the ports registered for the job until the developer application receives one mapped port for each remote agent, wherein the directory service creates port mappings via NAT as needed to fulfill poll requests;

the directory service periodically polling the scheduler to verify that the job has not terminated;

for each registered port registered at the directory service, the developer application connecting to the remote agent on a corresponding compute node and creating and debugging a user process with messages continuing back and forth between the developer application and the remote agent until the debugging session is complete; and the directory service discovering that the debugging session is complete and deleting all forwarding ports.

20. The computer system of claim 19, wherein the client computer system is connected on the public network and the head node computer system is connected on both a private network of the cluster and the public network, and wherein the public network is external to the private network of the cluster, and each remote agent is implemented on the private network of the cluster.

\* \* \* \* \*